United States Patent [19]

Kataoka

[11] Patent Number: 5,444,567
[45] Date of Patent: Aug. 22, 1995

[54] LIGHT CONTROL DEVICE

[75] Inventor: Keiji Kataoka, Ibaraki, Japan

[73] Assignee: Hitachi Koki Co., Ltd., Tokyo, Japan

[21] Appl. No.: 973,620

[22] Filed: Nov. 9, 1992

[30] Foreign Application Priority Data

Nov. 12, 1991 [JP] Japan .................. 3-295936

[51] Int. Cl.⁶ ................................ G02F 1/29
[52] U.S. Cl. .................... 359/319; 359/315;
          359/251; 359/254; 385/8; 385/36; 385/129
[58] Field of Search ............... 385/8, 10, 14, 37, 36,
          385/122, 129, 130, 142; 359/245, 251, 254, 315,
          322, 319, 197

[56] References Cited

U.S. PATENT DOCUMENTS

| 3,904,270 | 9/1975 | Cheo | 385/8 |
|---|---|---|---|
| 3,951,513 | 4/1976 | Masi | 385/8 |
| 4,179,184 | 12/1979 | Nelson | 385/8 |
| 4,902,088 | 2/1990 | Jain et al. | 385/8 |
| 5,144,603 | 9/1992 | Mozume et al. | 369/44.14 |
| 5,153,770 | 10/1992 | Harris | 359/245 |

FOREIGN PATENT DOCUMENTS 57-195216  11/1982  Japan .

Primary Examiner—Scott J. Sugarman
Assistant Examiner—Thomas Robbins
Attorney, Agent, or Firm—Sughrue, Mion, Zinn, Macpeak & Seas; Richard C. Turner; Marc S. Kaufman

[57] ABSTRACT

A light control device including an electro-optical material, a light refraction device mounted on the surface of the electro-optical material and electrodes provided on respective front and back major surfaces of the electro-optical material. A waveguide layer may be formed on the electro-optical material, with one electrode formed on an upper major surface of the waveguide layer and another electrode on the lower major surface of the electro-optical material. A prism or a diffraction grating may be used as the light refraction device. The light control device is particularly useful in laser printers and optical disk devices.

13 Claims, 5 Drawing Sheets

LIGHT CONTROL DEVICE

BACKGROUND OF THE INVENTION

1. Field of the Invention

The present invention is directed to a light control device for deflecting light at high speeds or for changing a light focusing position at high speeds. The control device may be used, for example, in a laser printer or in an optical disk device.

2. Description of the Background Art

Some conventional light control devices (EO devices) take advantage of an electro-optical effect whereby the refractive index of a transparent medium is altered by applying an electric field to the transparent medium. These devices may be of a first type wherein light is directed through an electro-optical material, or of a second type wherein light is directed through a waveguide layer formed on an electro-optical material.

FIG. 2 is an explanatory view of a light control device of the first type mentioned above.

In FIG. 2, an electro-optical material 2 is formed in the shape of a triangular prism having a thickness d (mm). Electrodes 7 and 8 are provided to completely cover opposite major surfaces of the electro-optical material 2.

When a voltage is applied to the electrodes 7 and 8, an electric field is generated between the electrodes within the electro-optical material 2. Ingoing light 9 is applied to the prism 7, and outgoing light 10 is deflected by the electric field.

FIG. 3 is an explanatory view of a light control device of the second type mentioned above.

In FIG. 3, a waveguide layer 40 is provided on an upper major surface of the electro-optical material 2. Electrodes 41 and 42 are formed on an exposed surface of the waveguide layer 40. When a voltage is applied between the electrodes 41 and 42, an electric field is generated along the exposed surface of the waveguide layer 40, so that light passing between the electrodes is deflected. A diffraction grating may be used instead of the prism 1 for directing light 9 into the waveguide layer 40.

In the light control device of the first type (FIG. 2), in order to produce a large deflection of the outgoing light 10, the electric field must be increased and the beam diameter D of the incoming light 9 must also be increased. Further, in order to obtain a large electric field with a small applied voltage, the thickness d of the electro-optical material 2 must be reduced.

Thus, in order to produce a large deflection of the outgoing light 10 in the light control device of the first type, a transversely-extended, oval shaped light must be made to enter an electro-optical material having a relatively small thickness d. However, it is difficult to realize the configuration. Furthermore, in order to produce a large deflection of the outgoing light 10 in the light control device of the second type (FIG. 3), the electric field intensity must be increased and the width of the light D must be increased. In order to increase the electric field intensity, it is desirable to decrease the interval d between electrodes 41, 41, thereby decreasing the distance between the electrodes 41, 42. However, when the width of the light D is increased, the electrode interval d should also be increased. Consequently, in the light control device of the second type (FIG. 3), it is difficult to produce a large deflection of the light.

SUMMARY OF THE INVENTION

It is, therefore, an object of the present invention to solve the above described problems associated with the conventional light control devices.

It is another object of the present invention to provide a light control device in which a large deflection angle or a large change in the light-focusing position can be obtained with only a small applied voltage.

In order to achieve the above objects, the light control device of the present invention includes an electro-optical material having upper and lower major surfaces, light input means mounted on the upper major surface of the electro-optical material, and electrodes provided on both the upper and lower major surfaces of the electro-optical material. A waveguide layer may be formed on the upper major surface of the electro-optical material in which case the upper electrode is formed on the waveguide layer.

In the above described configuration of the present invention, it is possible to obtain large deflection angles or a large change in the light-focusing position with a small applied voltage.

DETAILED DESCRIPTION OF THE PREFERRED EMBODIMENTS

The light control device according to the present invention will be described below with reference to the figures.

Figure 1:
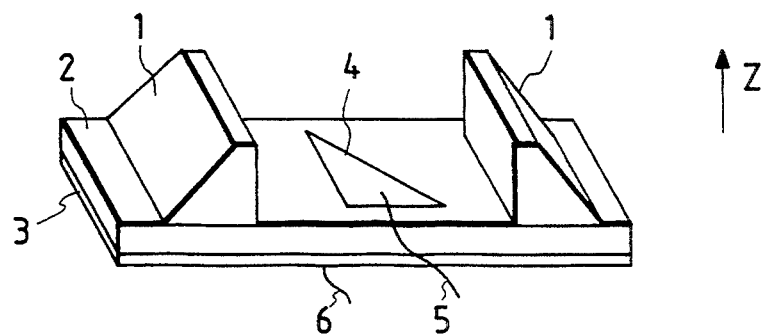
FIG. 1 is a perspective view of the light control device according to the present invention.
Figure 2:
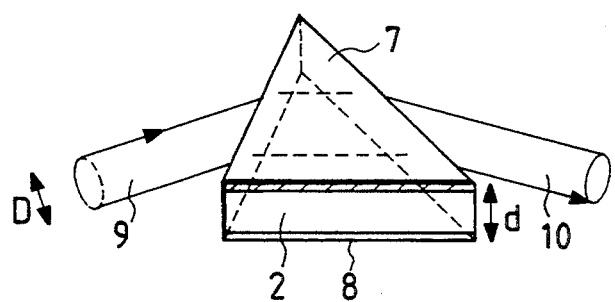
FIG. 2 is a perspective/explanatory view of a conventional light deflector.
Figure 3:
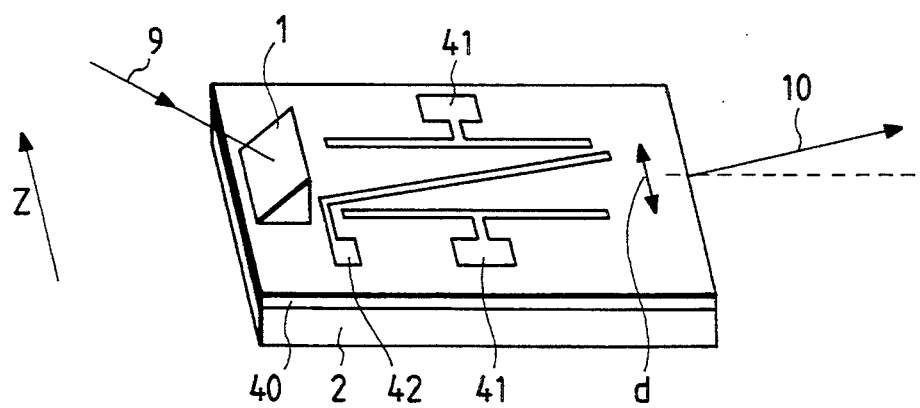
FIG. 3 is a perspective/explanatory view of a conventional waveguide-layer type light deflector.

FIG. 1 is a perspective view of an embodiment of the present invention. The light control device shown in FIG. 1 deflects light passing through an electro-optical material 2. A LiNbO$_3$ crystal can be used as the electro-optical material 2, with the thickness direction being represented by an arrow Z. The light path for this device is shown in FIG. 6. As shown in FIG. 6, incoming light 8 is deflected downwardly into the electro-optical material 2. Since the electro-optical material 2 is relatively thin, the light is directed through the material 2 in a direction substantially parallel to upper and lower major surfaces of the electro-optical material 2. The refractive index of the material 2 is high (e.g., 2.22). A pair of rutile prisms 1 each having a high refractive index may therefore be used as a light input means to direct light into and out of the material 2. The light directed through the material 2 is completely reflected on a lower major surface of the electro-optical material 2, and directed through the electro-optical material 2 to the second rutile prism 1. A triangular electrode 4 (FIG. 1) is disposed on a portion of the upper, major surface of the electro-optical material 2, and an electrode 3 is provided to cover the lower, major surface. A voltage is applied across the electrodes 3, 4 through lead wires 5, 6, respectively, so as to generate an electric field in the Z-direction. The refractive index in the electro-optical material 2 is changed by the application of the voltage between the electrodes. The principle by which light is deflected in the triangular electrode 4 will be described next with reference to FIGS. 4 and 5.

Figure 4:
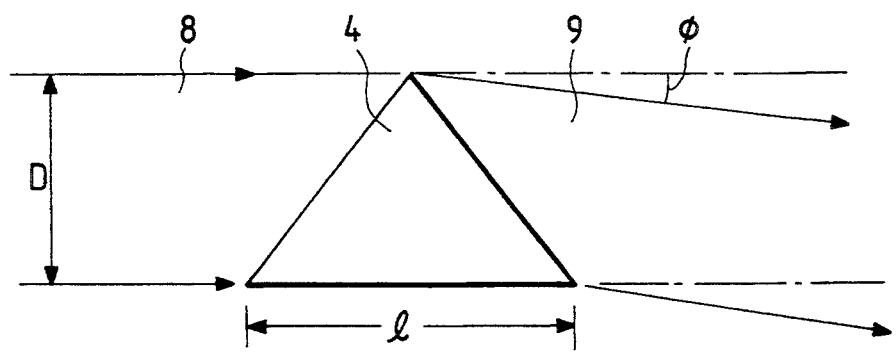
FIG. 4 is an explanatory view for explaining a deflection principle for a light deflection device which includes a triangular electrode.

FIG. 4 illustrates the case in which light in the electro-optical material 2 passes under a triangularly shaped electrode 4. The width of the light is represented by D in FIG. 4. It is assumed that the refractive index is equal to a value n for portions of the electro-optical material 2 outside from the electrode, and that the refractive index is equal to a value n+Δn for portions of the electro-optical material 2 under the electrode. If it is assumed that an electro-optical coefficient for the electro-optical material, a thickness of the material, and an applied voltage are represented by r, d, and V, respectively, then Δn can be expressed according to the following equation:

$$\Delta n = (\tfrac{1}{2}) n^3 r V / d \quad (1)$$

The deflection angle $\phi$ (FIG. 4) can be expressed as follows:

$$\phi = \Delta n \times 1 \quad (2)$$

where 1 is the length of the base shown in FIG. 4.

Figure 5:
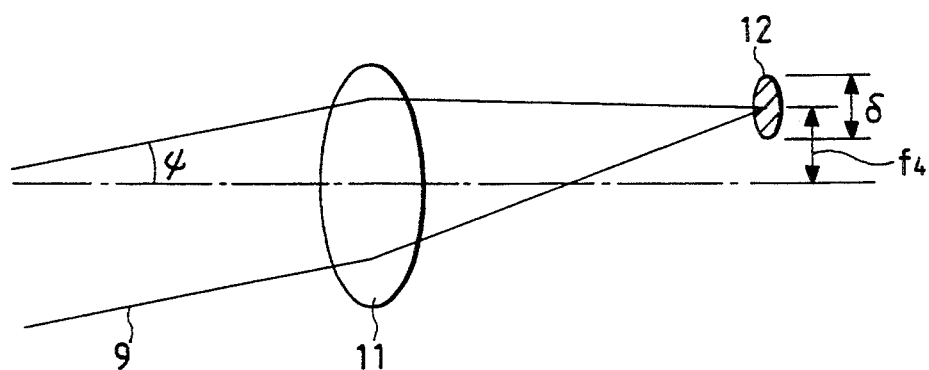
FIG. 5 is a explanatory view for explaining a deflection principle for a light deflection device using the triangular electrode in FIG. 4.
Figure 6:
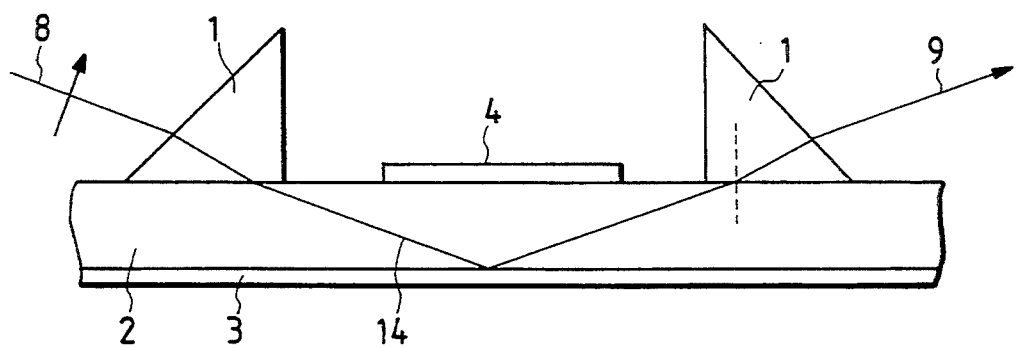
FIG. 6 is a sectional view illustrating how light is propagated through the light control device of the present invention.

In FIG. 5, light is shown exiting the electro-optical material, the light being focused by a lens 11 having focal length f.

The deflection angle $\Psi$ of the light exiting the material is expressed as follows:

$$\Psi = n\phi \quad (3)$$

The focused spot diameter $\delta$ is expressed as follows:

$$\delta = 4\lambda f/(\pi D) \quad (4)$$

The number of resolution points N is expressed as follows:

$$N = f\phi/\delta$$

The following equation is obtained by combining equations (1) and (4):

$$N = (\tfrac{1}{8}\lambda)\pi \ln^4 r(V/d) \quad (5)$$

The base 1 of the triangular electrode 4 is known to be proportional to the width D of the light. Thus, according to equation (5), in order to increase the number of resolution points N, it is necessary to also increase the width D of the incoming light and to reduce the thickness d of the electro-optical material.

In the light control device according to one embodiment of the present invention, as shown in FIGS. 1 and 6, light is incident on a surface of the electro-optical material. Accordingly, it is relatively easy to increase the width D of the light. Further, the thickness d of the electro-optical material can be made relatively small by grinding, deposition, or the like.

When LiNbO$_3$ crystal is used as the electro-optical material, and if it is assumed that:

$r = 30.8 \times 10^{-12}$ m/V
$n = 2.22$
$\lambda = 0.633$ [$\mu$m]
$1 = 5.0$ [mm]
$d = 0.1$ [mm]
$v = 100.0$ [v], then the number of resolution points, as determined according to equation (5), is approximately 2.

Figure 7:
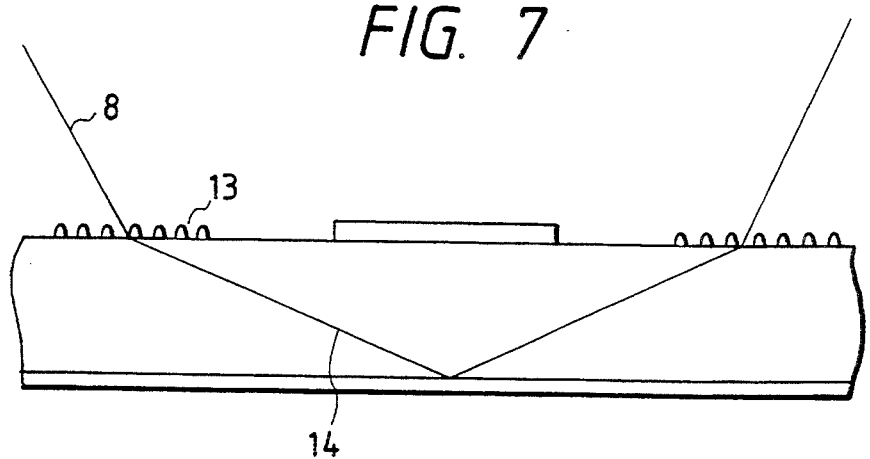
FIG. 7 is a sectional view illustrating how light is propagated through the light, control device of the present invention.
Figure 8:
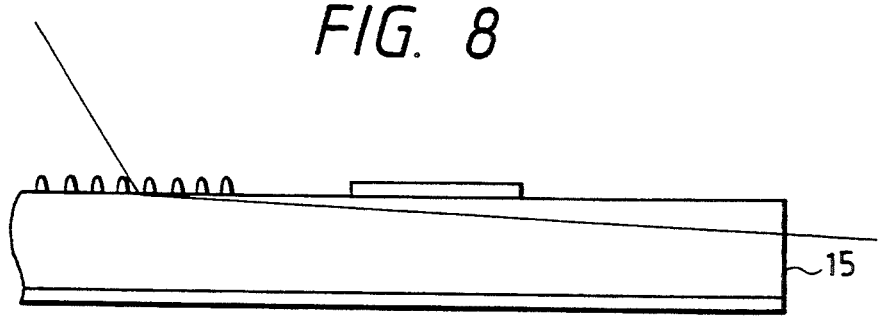
FIG. 8 is a sectional view illustrating how light is propagated through the light control device of the present invention.

Instead of using a prism 1 for directing the light into the electro-optical material 2, as shown in FIGS. 1 and 6, a grating may be used, as shown in FIG. 7. Further, the device may be constructed so that only one diffraction grating is used such that light exits from an end surface of the material 2, as shown in FIG. 8.

Figure 9:
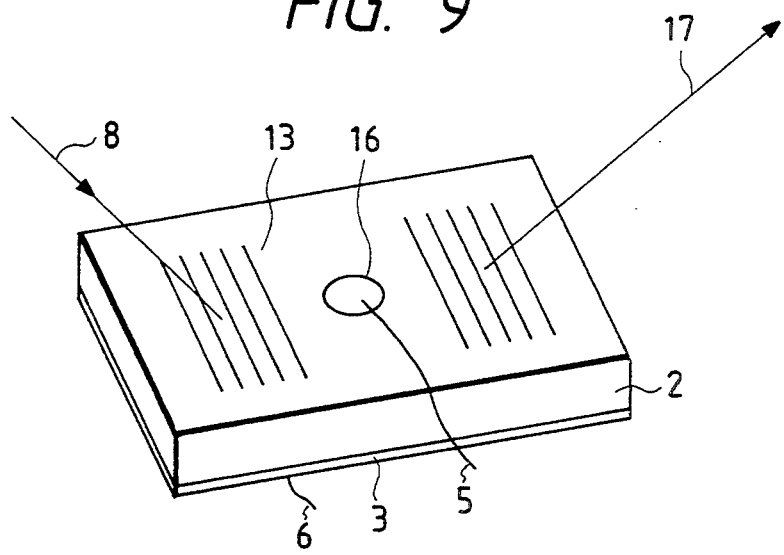
FIG. 9 is a perspective view of a light control device of the present invention which includes a variable focus function.
Figure 10:
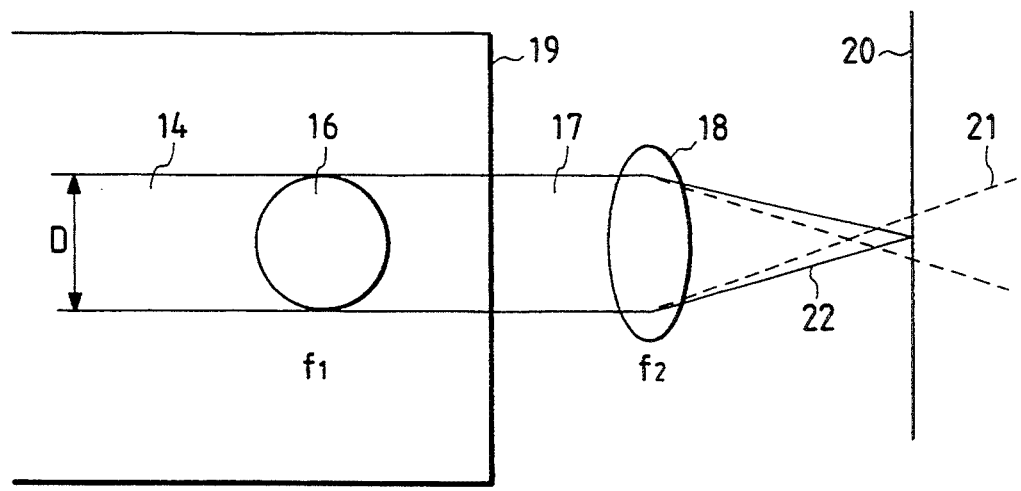
FIG. 10 is a schematic view illustrating the principle of variable focus of a light control device including a circular electrode.

FIG. 9 shows another embodiment of the present invention in which a circular electrode 16 is used instead of the triangular electrode 4 shown in FIGS. 1 and 6, and in which a grating 13 is used instead of a prism for directing light into and out of the electro-optical material 2. The transmission of light in the electro-optical material 2 is similar to that shown in FIG. 7. A voltage is applied to the circular electrode 16 and to electrode 3 provided on the lower major surface of the electro-optical material 2 by lead wires 5 and 6, respectively. The light control device shown in FIG. 9 changes the light focusing position at high speeds. That is, the light control device operates similar to a cylindrical lens having a high-speed variable focus. The principles of operation for such a device will be described below with reference to FIG. 10. A voltage is applied to the electrodes 16, 3, and light 14 passes between the electrodes so that outgoing light 17 is modulated by an electro-optical effect. Reference number 19 indicates the boundary between the electro-optical material 2 and the surrounding environment. A lens 18 is provided externally to the electro-optical material for focusing the light on a screen 20.

Figure 11:
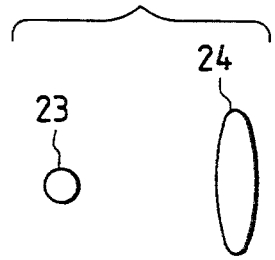
FIG. 11 is a schematic view illustrating the principle of variable focus of a light control device including a circular electrode.

When there is no applied voltage between the electrodes, light 22 advances to form an isotropic spot 23 on the screen 20, as indicated in FIG. 11. However, when a voltage is applied between the electrodes, the light focusing position changes, as indicated by the dotted line 21 in FIG. 10, due to a one-directional focusing or dispersing of light created by the application of a potential between the electrodes. Accordingly, an oval spot 24 (see FIG. 11) is created on the screen 20, the shape of the spot being enlarged in one direction only. Thus, the device is advantageously used for varying the shape and size of a projected light beam. The operational characteristics are determined and described below.

It is assumed that a voltage V is applied to the circular electrode 16 to increase the refractive index by $\Delta n$. This causes the circular electrode to function as a cylindrical "lens". The focal length of this "lens" is represented by f1 (FIG. 10), which is obtained according to the following equation:

$$f1 = D/(4\Delta n) \qquad (6)$$

Assuming that the focal length of the lens 18 is represented by f2, the focal point on the screen is shifted by an amount $\Delta b$, calculated as follows:

$$\Delta b = -(f2)^2/f1 \qquad (7)$$

When the focal point is shifted by an amount $\Delta b$, then the light spot is extended by an amount $\delta(\Delta b)$ calculated as follows:

$$\delta(\Delta b)^2 = (\delta O)^2 \{1 + (\Delta b)^2/(zO)^2\} \qquad (8)$$

where, $\delta O$ represents a spot diameter when the focal point is not shifted, and zO represents a quantity determined as follows:

$$zO = \pi(\delta O)^2/(4\lambda) \qquad (9)$$

A ratio of extension m of the spot diameter due the shift of the focal point is calculated as follows:

$$m = \delta(\Delta b)/\delta O$$

When equations (6) through (9) and (1) are substituted in the above equation, the following equation is obtained:

$$m = \sqrt{[1 + [(\pi/2\lambda)Dn^3 r(V/d)]^2]} \qquad (10)$$

When a LiNbO$_3$ crystal is used as the electro-optical material, and if it is assumed that,
r = 30.8 × 10$^{-12}$ m/V
n = 2.22
$\lambda$ = 0.633 [$\mu$m]
D = 5.0 [mm]
d = 0.1 [mm], and
V = 100.0 [v],
then m equals 4.2 using equation (10). Thus, it is found that the spot diameter can be changed by as much as four times its original value.

The light control device having opposite gratings for converting the incoming light into outgoing light, as shown in FIG. 7, is superior in the following respects. When a semiconductor laser is used as the light source, the wavelength of the light may fluctuate according to changes in the environmental temperature. However, the device in FIG. 7 exhibits optical characteristics such that the light control device is not influenced by these fluctuations in wavelength. Thus, even if the wavelength of the laser light fluctuates so that the laser light is diffracted by the incoming-side grating at different angles, all of the light is reflected on the back surface of the crystal, and the outgoing light from the outgoing-side grating is subjected to a diffraction effect similar to that of the incoming light directed through the incoming-side grating, so that the outgoing angle of the outgoing light is not influenced by the fluctuation of the wavelength. Clearly, if the outgoing angle of the outgoing light changes suddenly, the light recording position of the laser light also changes suddenly so that the printing quality deteriorates.

Figure 12:
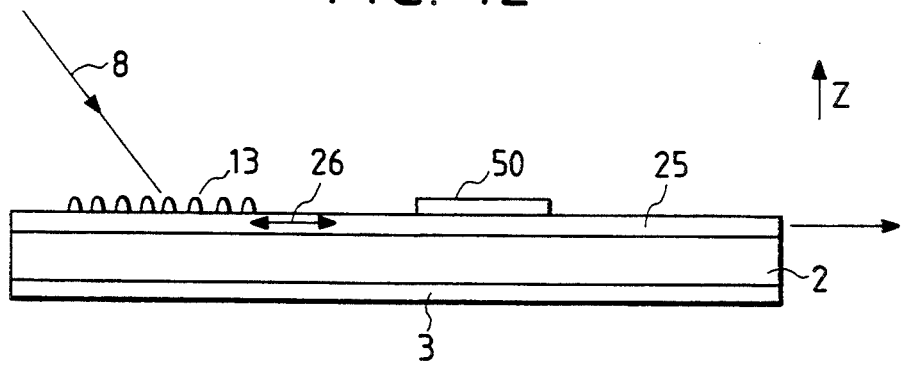
FIG. 12 is a schematic view of a light control device including a waveguide layer according to the present invention.

Although the above description relates to the use of an electro-optical bulky material, light may also be transmitted by a waveguide layer. FIG. 12 shows the case where a z-cut LiNbO$_3$ crystal is used as an electro-optical material 2, and a waveguide layer 25 is formed by Ti diffusion on an upper surface of the material 2. Incoming light 8 is led by a grating 13 into the waveguide layer 25 to thereby become directed light 26. As described above, an electrode 50 is triangular in the case where the electrode 50 is used as a light deflection device, and circular in the case where the electrode 50 is used as a variable focus device.

Figure 13:
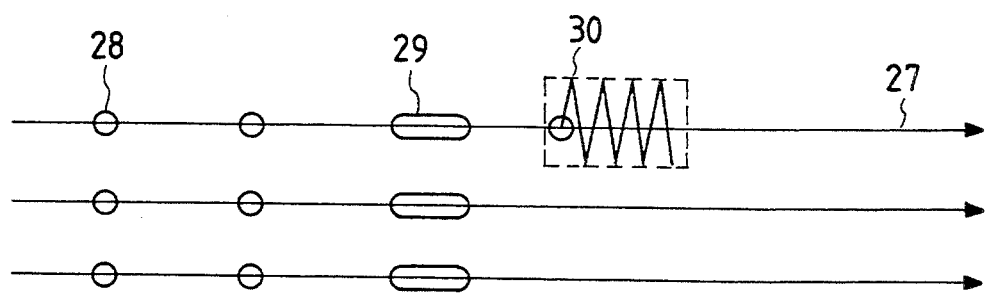
FIG. 13 is a view illustrating how the present invention is applied to a laser printer.

Since the light deflection device described above is effective in controlling the light path, it can be applied to a wide range of devices. For example, in a laser printing apparatus, the size of dots recorded on a recording material must be rapidly changed so that half-tone recording can be performed accurately. That is, when recording dots, large dots become deep in black density, while small dots become pale in black density. By employing the present invention in such a device, the number of gradations from black to white can be increased thereby improving the half-tone picture. FIG. 13 illustrates one case in which the light deflection device according to the present invention (FIG. 1) is used in conjunction with a laser printer. In a laser printer, light scanning is performed on a recording material, as shown by an arrow 27, by means of a rotatable, polygonal mirror. The intensity of the light is modulated so that dots 28, 29 and 30 are recorded. The dot 28 is recorded when the recording time is short. In this case, recording is made with a small dot, i.e., with pale black density.

The dot 29 is recorded when the recording time is long. In this case, a recording is made with a dot deeper in black density than the dot 28. The dot 30 is recorded when the recording time is the same as that of the dot 29, but while the light is saw-tooth oscillated by the light deflection device according to the present invention in a direction vertical to the light scanning line. In this case, the recording results in a dot which is large in size and deep in black density. Wide variations in gradation can be obtained if the amplitude of oscillation is changed in a direction vertical to the light scanning line.

Figure 14:
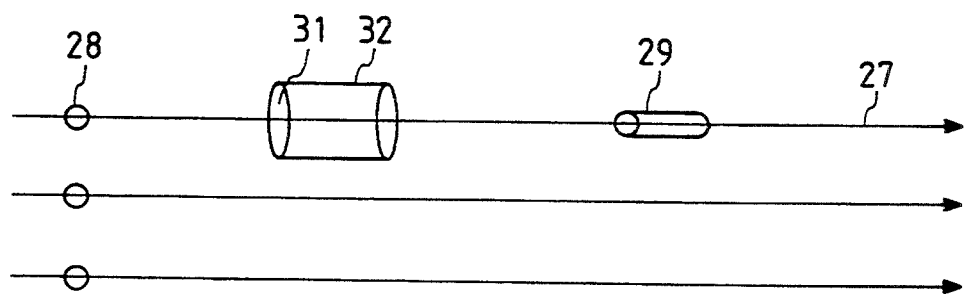
FIG. 14 is a view illustrating how the present invention is applied to another laser printer.

FIG. 14 shows a recording method for a laser printer including the variable focus device of the present invention (FIG. 9). When the variable focus device is not operated, dots 28 and 29 are recorded. When the variable focus device becomes operational, a light spot 31 is produced, the light spot 31 being larger in size in a direction vertical to a scanning line 27 so that a large dot 32 is recorded with deep black density. Also, in this method, wide variations of gradation can be obtained by changing the size of the spot.

As illustrated in FIGS. 13 and 14, when the light control device according to the present invention is employed, it is possible to obtain many different gradations.

Figure 15A:
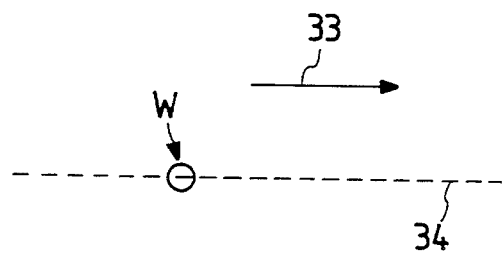
FIGS. 15a and 15b are views illustrating how the present invention is applied to a phase-change-type optical disk.
Figure 15B:
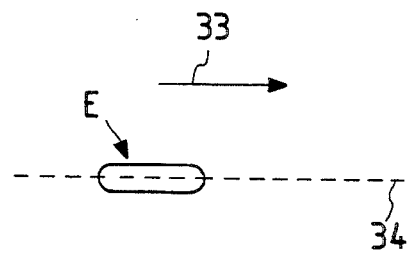

FIG. 15 shows an example in which the light control device is used in a phase-change type optical disk apparatus. FIG. 15(a) shows the case in which an optical disk is rotated in the direction indicated by arrow 33 so that a recording spot W records data on a track 34. FIG. 15(b) shows the case in which the light control device according to the present invention (FIG. 9) is operated so as to elongate the spot in the track direction (from W to E) to thereby erase the data on the track. The spot is elongated due to the fact that a once heated phase-changing material of an optical disk is gradually cooled so that the phase is changed into a phase corresponding to an erasing state.

The light deflection device according to the present invention can also be effectively applied with respect to optical disk devices in order to permit the accessing of different tracks at high speeds for reading data.

As described above, in the light control device according to the present invention, which includes an electro-optical material, light input means mounted on the electro-optical material, and electrodes provided on front and back surfaces of the electro-optical material, it is possible to obtain a large deflection angle or a large change in the light focusing position with only a small applied voltage.

In the foregoing examples, the back surface of the light control was completely flat in simplicity. In this case, the crystal thickness become thin because it is desirable that the spacing between electrodes formed on the both of the lower and upper surfaces, is narrow. If the thin crystal is weak in mechanics, thick crystal can be used in such a manner that on the back surface of a relatively thick crystal, a hollow is made and on the flat part of the hollow, the back electrode is formed.

What is claimed is:

1. A light control element, comprising:
   a crystal material having an electro-optical effect;
   two electrodes provided on upper and lower surfaces of said crystal material, respectively, at least one of said two electrodes having a circular shape,
   a waveguide layer interposed between at least one of said electrodes and said crystal material;
   wherein a light incident within said crystal material is controlled by applying a voltage between said two electrodes.

2. A light control element as claimed in claim 1, further comprising a light incident means provided on said upper surface of said crystal material, for directing the light into said crystal material.

3. A light control element as claimed in claim 2, wherein said light incident means comprises at least one prism.

4. A light control element as claimed in claim 1, further comprising a light incident means provided on said upper surface of said waveguide layer for guiding the light into said crystal material.

5. A light control element as claimed in claim 4, wherein said light incident means comprises at least one prism.

6. A light control element as claimed in claim 4, wherein said light incident means comprises at least one grating.

7. A light control element as claimed in claim 1, wherein said crystal material a variable focusing element of a laser printer.

8. A light control element as claimed in claim 1, wherein said crystal material is one of an eraser element and a recording element of a phase-change type optical disc device.

9. A light control element, comprising:
   a crystal material having an electro-optical effect;
   two electrodes provided on upper and lower surfaces of said crystal material, respectively, at least one of said two electrodes having a circular shape; and
   light incident means provided on an upper surface of said crystal material, for directing light into said crystal material, said light incident means comprising at least one prism;
   wherein a light incident within said crystal material is controlled by applying a voltage between said two electrodes.

10. A light control element, comprising:
    a crystal material having an electro-optical effect;
    two electrodes provided on upper and lower surfaces of said crystal material, respectively, at least one of said two electrodes having a circular shape; and
    light incident means provided on an upper surface of said crystal material, for directing light into said crystal material, said light incident means comprising at least one grating;
    wherein a light incident within said crystal material is controlled by applying a voltage between said two electrodes.

11. A light control element, comprising:
    a crystal material having an electro-optical effect;
    a first electrode having a circular shape and provided on an upper surface of said crystal material;
    a second electrode provided on a lower surface of said crystal material;
    a waveguide layer provided between said crystal material and said first electrode; and
    light incident means provided on an upper surface of said waveguide layer for guiding light into said waveguide layer.

12. A light control element as claimed in claim 11, wherein said light incident means comprises at least one prism.

13. A light control element as claimed in claim 11, wherein said light incident-means comprises at least one grating.

* * * * *